United States Patent
Gibson et al.

(10) Patent No.: US 10,019,841 B2
(45) Date of Patent: Jul. 10, 2018

(54) DRIVER ASSISTANCE SYSTEMS FOR VEHICLE

(75) Inventors: Joel S. Gibson, Linden, MI (US);
Steven V. Byrne, Goodrich, MI (US);
Richard D. Shriner, Grand Blanc, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 379 days.

(21) Appl. No.: 14/117,759

(22) PCT Filed: May 18, 2011

(86) PCT No.: PCT/US2011/036967
§ 371 (c)(1),
(2), (4) Date: Nov. 14, 2013

(87) PCT Pub. No.: WO2012/158167
PCT Pub. Date: Nov. 22, 2012

(65) Prior Publication Data
US 2014/0176605 A1    Jun. 26, 2014

(51) Int. Cl.
*G09G 5/00* (2006.01)
*G06T 19/00* (2011.01)
(Continued)

(52) U.S. Cl.
CPC .............. *G06T 19/006* (2013.01); *B60R 1/00* (2013.01); *H04N 17/002* (2013.01); *B60R 2300/305* (2013.01); *B60R 2300/806* (2013.01)

(58) Field of Classification Search
CPC ....... F16H 63/42; B60Q 1/54; B60C 23/0408; B60R 1/12; B60R 25/0225; B60R 1/00;
(Continued)

(56) References Cited

U.S. PATENT DOCUMENTS

| | | | |
|---|---|---|---|
| 5,289,321 | A | 2/1994 | Secor |
| 5,359,363 | A | 10/1994 | Kuban et al. |

(Continued)

FOREIGN PATENT DOCUMENTS

| | | |
|---|---|---|
| JP | 6414700 | 1/1964 |
| JP | 59114139 | 7/1984 |

(Continued)

OTHER PUBLICATIONS

"Edmunds", combined screen shots from http://www.edmunds.com/bmw/5-series/2010/features-specs.html?sub=sedan&style=101166700 (last visited Apr. 20, 2015) and http://web.archive.org/web/20110223063738*/http://www.edmunds.com/bmw/5-series/2010/features-specs.html (last visited Apr. 20, 2015) (Edmunds last saved Feb. 23, 2011).*

(Continued)

*Primary Examiner* — Xiao M. Wu
*Assistant Examiner* — Sarah Lhymn
(74) *Attorney, Agent, or Firm* — Honigman Miller Schwartz and Cohn, LLP

(57) ABSTRACT

A vehicular camera includes a housing, a lens, an image sensor positioned for receiving images from the lens, a processor, and a memory. The memory contains a plurality of overlays. The processor is programmed to (a) receive first input data from a vehicle in which the camera is to be mounted, wherein the first input data correspond to the configuration of the vehicle, and (b) select a particular overlay to display based at least in part on the input received.

20 Claims, 6 Drawing Sheets

| | WHEEL BASE (inch) | 100" | 110" | 120" | 130" |
|---|---|---|---|---|---|
| OVERLAY MAP COUNT | OVERLAY RADIUS (mm) | SWA SWITCH (deg) | SWA SWITCH (deg) | SWA SWITCH (deg) | SWA SWITCH (deg) |
| 22-1 | 42500 | 30 | 40 | 40 | 40 |
| 22-2 | 22500 | 110 | 120 | 130 | 140 |
| 22-3 | 15800 | 180 | 190 | 210 | 220 |
| 22-4 | 12400 | 240 | 250 | 270 | 300 |
| 22-5 | 10400 | 300 | 320 | 340 | 370 |
| 22-6 | 9000 | 360 | 380 | 410 | 430 |
| 22-7 | 8100 | 410 | 430 | 460 | 490 |
| 22-8 | 7400 | 450 | 470 | 500 | 540 |
| 22-9 | 6800 | 490 | 510 | 550 | 590 |
| 22-10 | 6400 | 530 | 550 | 600 | 640 |
| 22-11 | 6000 | 570 | 600 | 630 | 670 |
| 22-12 | 5700 | 600 | 630 | 660 | 690 |
| 22-13 | 5400 | 630 | 650 | 680 | |
| 22-14 | 5200 | 650 | 670 | | |
| 22-15 | 5100 | 670 | 690 | | |
| 22-16 | 4900 | 690 | | | |
| 22-17 | 4800 | 700 | | | |

(51) Int. Cl.
  *B60R 1/00* (2006.01)
  *H04N 17/00* (2006.01)
(58) Field of Classification Search
  CPC ..... G06T 19/006; G06T 11/60; G06T 15/005;
    G06T 1/20; G06T 1/60; H04N 7/181;
    G08G 1/04; G01S 3/7864
  USPC ............... 345/418, 501, 530, 619, 633, 634;
    348/143, 148, 149, 169, 177, 207.99;
    340/425.5, 426.31, 435, 436, 438, 441,
    340/442, 443, 444, 456
  See application file for complete search history.

(56) References Cited

U.S. PATENT DOCUMENTS

| | | | |
|---|---|---|---|
| 5,410,346 | A | 4/1995 | Saneyoshi et al. |
| 5,414,461 | A | 5/1995 | Kishi et al. |
| 5,444,478 | A | 8/1995 | Lelong et al. |
| 5,574,443 | A | 11/1996 | Hsieh |
| 5,793,308 | A | 8/1998 | Rosinski et al. |
| 5,949,331 | A | 9/1999 | Schofield et al. |
| 6,155,377 | A * | 12/2000 | Tokunaga et al. ............. 180/446 |
| 6,578,017 | B1 | 6/2003 | Ebersole et al. |
| 6,631,994 | B2 | 10/2003 | Suzuki et al. |
| 7,843,451 | B2 | 11/2010 | Lafon |
| 7,930,160 | B1 | 4/2011 | Hosagrahara et al. |
| 8,405,724 | B2 | 3/2013 | Jeon et al. |
| 8,451,107 | B2 | 5/2013 | Lu et al. |
| 2002/0120371 | A1* | 8/2002 | Leivian ............... B60R 16/0231 701/1 |
| 2002/0128754 | A1* | 9/2002 | Sakiyama ............... B60Q 9/005 701/1 |
| 2006/0287826 | A1* | 12/2006 | Shimizu et al. .............. 701/216 |
| 2007/0038422 | A1* | 2/2007 | Wang et al. ....................... 703/8 |
| 2007/0120657 | A1 | 5/2007 | Schofield et al. |
| 2007/0194899 | A1 | 8/2007 | Lipman |
| 2008/0266541 | A1 | 10/2008 | Yung et al. |
| 2008/0300745 | A1* | 12/2008 | Goossen ............... G05D 1/0044 701/25 |
| 2009/0179916 | A1* | 7/2009 | Williams et al. ............. 345/629 |
| 2012/0316779 | A1* | 12/2012 | Kanno ............... B62D 15/0295 701/436 |

FOREIGN PATENT DOCUMENTS

| | | |
|---|---|---|
| JP | 05133336 | 9/1984 |
| JP | 6080953 | 5/1985 |
| JP | 6079889 | 10/1986 |
| JP | 6272245 | 5/1987 |
| JP | 62122487 | 6/1987 |
| JP | 04114587 | 4/1992 |
| JP | 0550883 | 3/1993 |
| JP | 0577657 | 3/1993 |
| JP | 05213113 | 8/1993 |
| JP | 06227318 | 8/1994 |
| JP | 074170 | 1/1995 |
| JP | 07105496 | 4/1995 |
| JP | 2630604 | 4/1997 |

OTHER PUBLICATIONS

Kannan, Saravanan, et al., "An Intelligent Driver Assistance System (I-Das) for Vehicle Safety Modelling Using Ontology Approach." International Journal of Ubicomp (IJU) vol. 1, No. 3, (Jul. 2010), pp. 15-29.*
Ballard, Dana H. et al., "Computer Vision", 1982, p. 88-89, sect. 3.4.1.
International Search Report and Written Opinion dated Sep. 9, 2011 for PCT Application No. PCT/US2011/036967.
Tokumaru et al., "Car Rear-View TV System with CCD Camera," National Technical Report vol. 34, No. 3, pp. 329-336, Jun. 1988 (Japan).
Wang et al., CMOS Video Cameras, article, 1991, 4 pages, University of Edinburgh, UK.

* cited by examiner

FIG. 6

| OVERLAY MAP COUNT | WHEEL BASE (inch) | 11a 100" | 11b 110" | 11c 120" | 11d 130" | 11c 120" | 11d 130" | 11e 140" |
|---|---|---|---|---|---|---|---|---|
| | STEERING GEAR | 36a 1 | 36a 1 | 36a 1 | 36a 1 | 36b 2 | 36b 2 | 36b 2 |
| | OVERLAY RADIUS (mm) | SWA SWITCH (deg) | SWA SWITCH (deg) | SWA SWITCH (deg) | SWA SWITCH (deg) | SWA SWITCH (deg) | SWA SWITCH (deg) | SWA SWITCH (deg) |
| 22-1 | 42500 | 30 | 40 | 40 | 40 | 30 | 40 | 40 |
| 22-2 | 22500 | 110 | 120 | 130 | 140 | 110 | 120 | 120 |
| 22-3 | 15800 | 180 | 190 | 210 | 220 | 180 | 190 | 200 |
| 22-4 | 12400 | 240 | 250 | 270 | 300 | 240 | 260 | 270 |
| 22-5 | 10400 | 300 | 320 | 340 | 370 | 300 | 320 | 340 |
| 22-6 | 9000 | 360 | 380 | 410 | 430 | 350 | 380 | 390 |
| 22-7 | 8100 | 410 | 430 | 460 | 490 | 400 | 420 | 440 |
| 22-8 | 7400 | 450 | 470 | 500 | 540 | 440 | 470 | 490 |
| 22-9 | 6800 | 490 | 510 | 550 | 590 | 480 | 520 | 530 |
| 22-10 | 6400 | 530 | 550 | 600 | 640 | 520 | 550 | 570 |
| 22-11 | 6000 | 570 | 600 | 630 | 670 | 550 | 580 | 590 |
| 22-12 | 5700 | 600 | 630 | 660 | 690 | 570 | 600 | |
| 22-13 | 5400 | 630 | 650 | 680 | | 590 | | |
| 22-14 | 5200 | 650 | 670 | | | | | |
| 22-15 | 5100 | 670 | 690 | | | | | |
| 22-16 | 4900 | 690 | | | | | | |
| 22-17 | 4800 | 700 | | | | | | |

DRIVER ASSISTANCE SYSTEMS FOR VEHICLE

CROSS REFERENCE TO RELATED APPLICATION

The present application is a 371 national phase filing of PCT Application No. PCT/US2011/036967, filed May 18, 2011.

FIELD OF THE INVENTION

The present invention relates to vehicular cameras and more particularly to rearview vehicular cameras that display overlays onto the camera image.

BACKGROUND OF THE INVENTION

Vehicular cameras are used for a variety of purposes, such as to assist a driver in avoiding obstacles behind a vehicle when backing up. Some cameras add overlays onto the camera image to assist the driver in determining distances to obstacles behind the vehicle, vehicle trajectory and other useful information. The overlays may be static or may be dynamic. A dynamic overlay is an overlay that is changed by the camera based on certain inputs. For example, some cameras display a predicted vehicle trajectory based on certain factors such as steering wheel angle. The overlays, whether static or dynamic, will change depending on the angle of mounting of the camera, the height of the camera off the ground, distance from the camera horizontally to the rear axle of the vehicle, the steering gear ratio for the vehicle, and possibly other factors. As a result, cameras for different vehicles up until now have had different programming and thus have different part numbers associated with them. This results in a potentially large number of part numbers and inventory. A particular vehicle family, such as a particular truck, may have numerous vehicle configurations that will impact the overlays that are displayed by the rearview camera. Such configurations would include, for example, regular cab with short bed, regular cab with long bed, extended cab with short bed and extended cab with long bed.

It would be desirable to reduce the number of separate part numbers that are associated with variations on programming for essentially the same camera.

SUMMARY OF THE INVENTION

In one aspect, the invention is directed to a vehicular camera including a housing, a lens, an image sensor positioned for receiving images from the lens, a processor, and a memory. The memory contains a plurality of overlays. The processor is programmed to:

receive first input data from a vehicle in which the camera is to be mounted, wherein the first input data correspond to the configuration of the vehicle, and select a particular overlay to display based at least in part on the input received.

BRIEF DESCRIPTION OF THE DRAWINGS

The present invention will now be described by way of example only with reference to the attached drawings in which:

FIG. 6 is another lookup table that is used by an enhanced version of the camera to determine which overlay to use on an image.

DETAILED DESCRIPTION OF THE INVENTION

Figure 1:
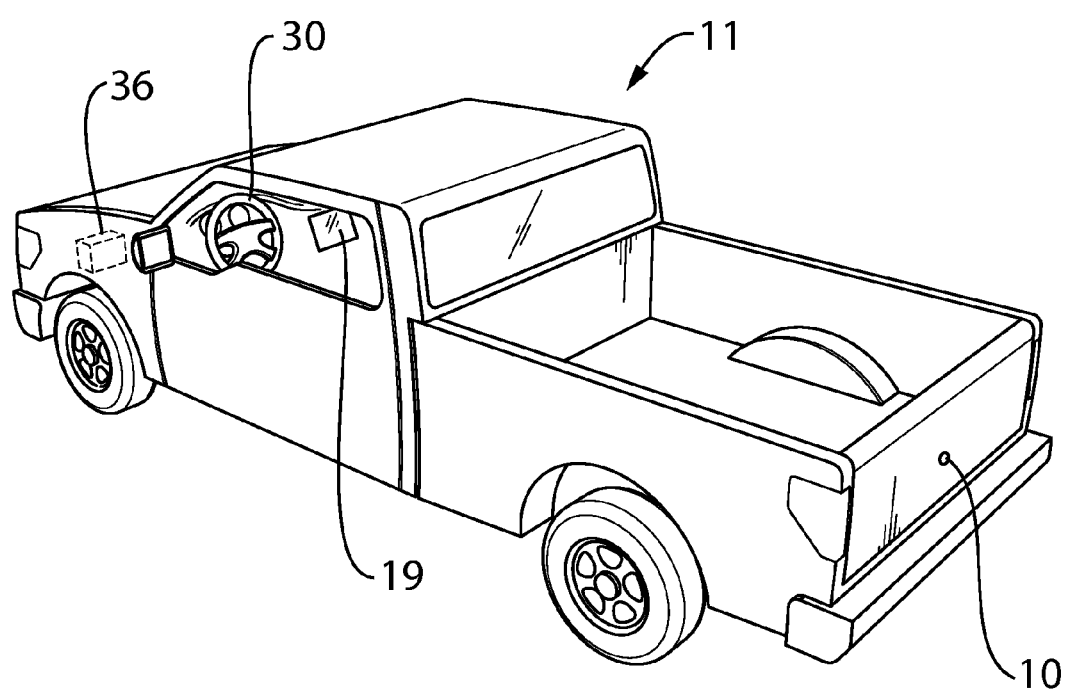
FIG. 1 is a perspective view of a vehicle with a vehicular camera in accordance with an embodiment of the present invention.
Figure 2:
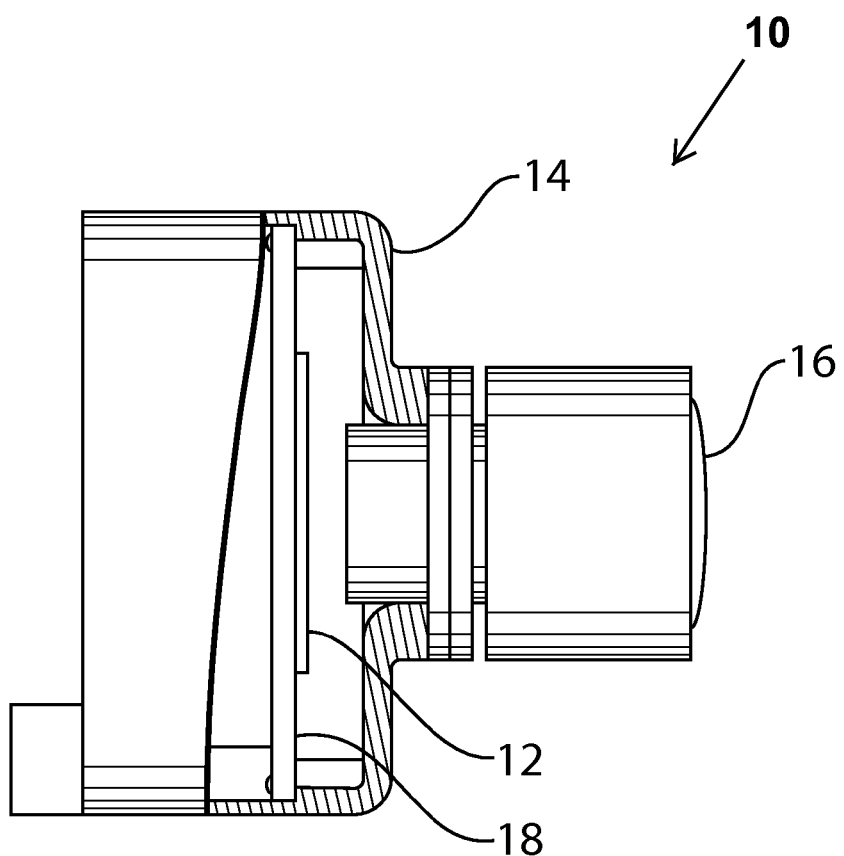
FIG. 2 is a cutaway side view of the vehicular camera shown in FIG. 1.
Figure 3:
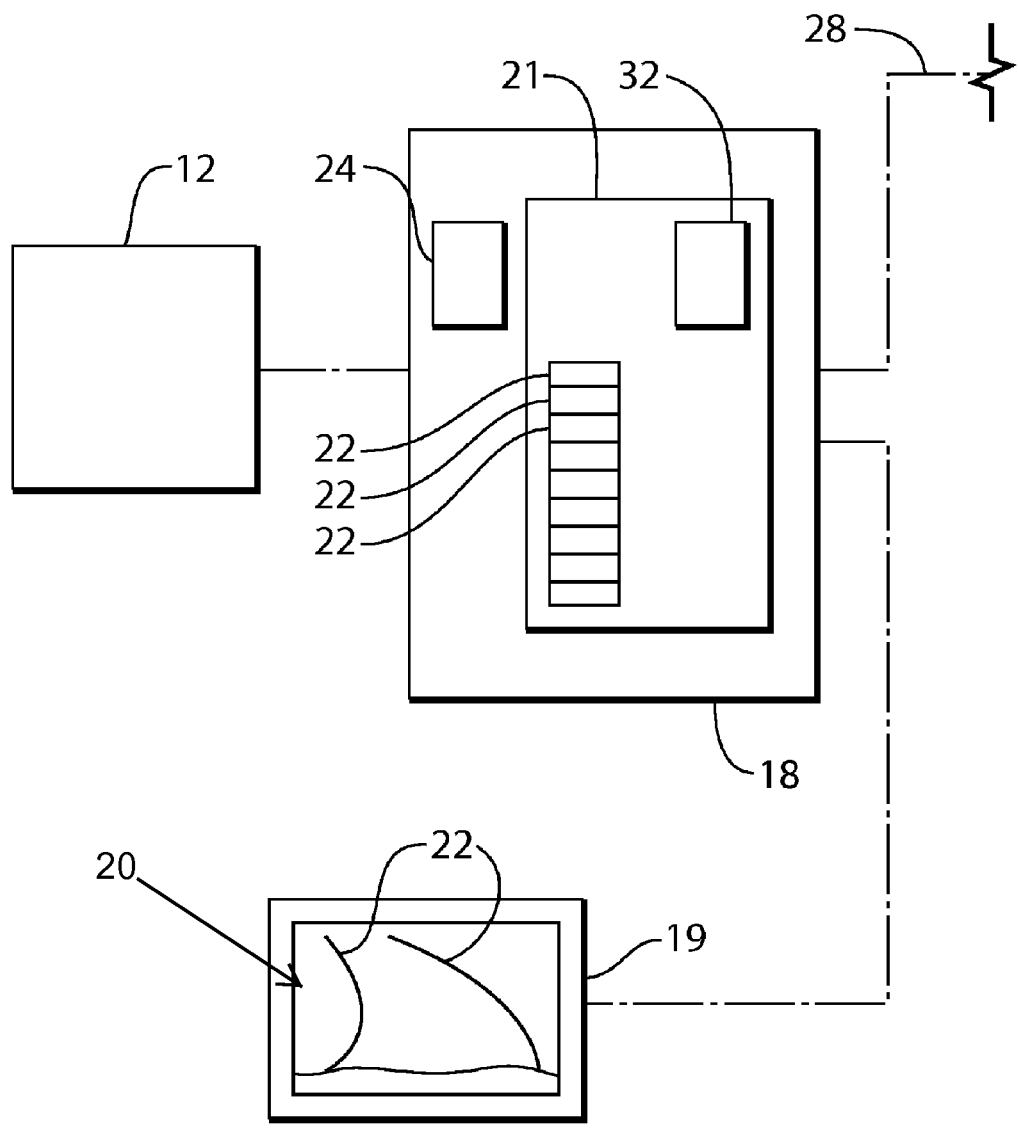
FIG. 3 is a schematic illustration of selected components from the camera shown in FIG. 1.
Figure 4:
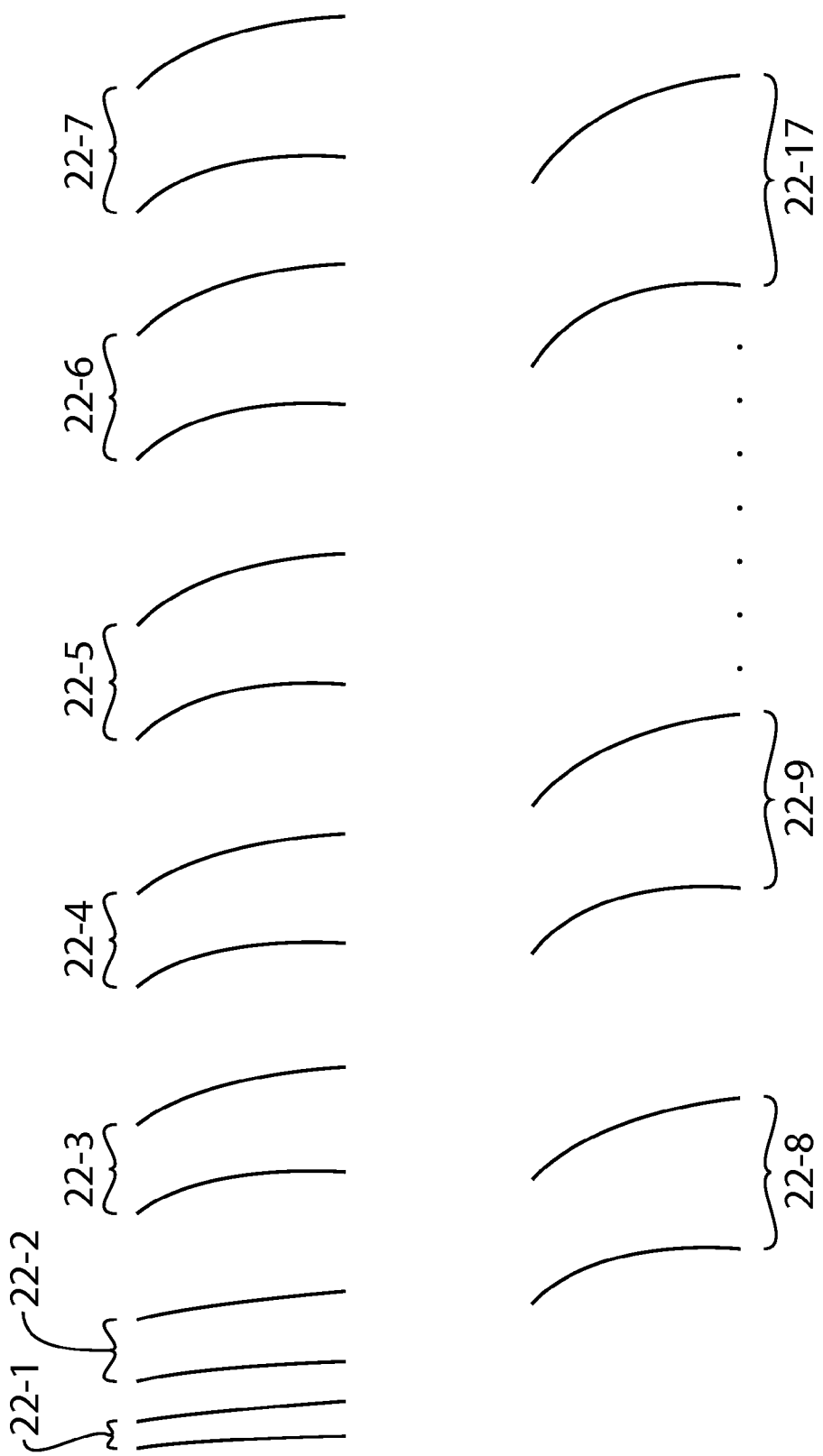
FIG. 4 is an illustration of selected overlays that are stored in a memory that is part of the camera shown in FIG. 1.

Reference is made to FIG. 1, which shows an exploded view of a vehicular camera 10 for a vehicle 11, in accordance with an embodiment of the present invention. In the embodiment shown, the camera 10 is a rearview camera that is configured to assist a vehicle driver when backing the vehicle up. Referring to FIG. 2, the vehicular camera 10 includes an image sensor 12 (eg. a CCD or a CMOS sensor), a housing 14, a lens 16, and an image processing board 18. The lens 16 transmits and focuses images from behind the vehicle 11 onto the image sensor 12. Referring to FIG. 3, the image processing board 18 communicates with and receives images from the image sensor 12 and transmits the images to other vehicular devices, such as an in-cabin display 19. The images are shown at 20. Referring to FIG. 3, the image processing board 18 includes a memory 21 in which is stored a set of overlays 22-1, 22-2, 22-3, 22-4, 22-5, 22-6, 22-7, 22-8, 22-9 . . . 22-17 (FIG. 4) and a processor 24 (FIG. 3) which selects an overlay to add to the images 20 (FIG. 3) prior to sending the images to the in-cabin display 19.

The overlays 22-1, 22-2, 22-3, 22-4, 22-5, 22-6, 22-7, 22-8, 22-9 . . . 22-17 (FIG. 4) are dynamic overlays in the sense that the processor 24 selects different ones to apply to the image 20 depending on certain criteria. For example, in the example shown, the overlays 22-1, 22-2, 22-3, 22-4, 22-5, 22-6, 22-7, 22-8, 22-9 . . . 22-17 represent predicted vehicle trajectories based on certain data concerning the vehicle 11.

As shown in FIG. 3, the camera 10 receives input data from the vehicle 11 via a bus 28 (eg. a LIN bus). The input data may include first input data which corresponds to the particular configuration of vehicle 11 the camera 10 is mounted to. For example, a particular vehicle family may include a range of vehicle configurations, covering vehicles with 4 different wheelbases. In this simplified example, other aspects of the vehicle configurations, such as the distance from the camera to the rear axle, are the same for each vehicle. The first input data would indicate to the camera 10 which of the 4 different vehicles the camera 10 is mounted to.

The input data may further include second input data which corresponds to the angle of the steering wheel in the vehicle 11. The steering wheel is shown at 30 in FIG. 1.

The processor 24 uses the first and second input data to identify which overlay 22 to use on the images 20. The processor 24 may achieve this in any suitable way. One such way is by using the first and second input data as input parameters for a lookup table shown at 32 that is stored in the memory 21.

Figure 5:
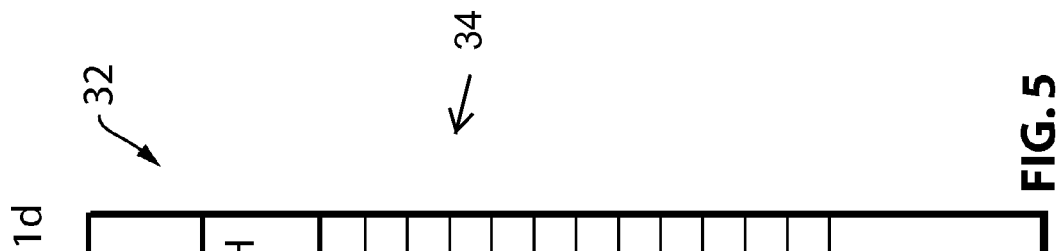
FIG. 5 is a lookup table that is used by the camera to determine which overlay to use on an image.

The lookup table 32 is shown in more detail in FIG. 5. As can be seen, and by way of example only, the aforementioned 4 different vehicle configurations are represented at 11a, 11b, 11c and 11d. A set of steering wheel angles are shown at 34 for each of the vehicle configurations 11a-11d. As can be seen, for vehicle configuration 11a (which has a wheelbase of 100"), if the second input data indicated a steering wheel angle of 240 degrees, the processor 24 would add the overlay shown at 22-4 in FIG. 4, to the image 20 (FIG. 3) prior to transmitting the image 20 with the overlay 22-4 to the in-cabin display 19. As another example, for vehicle configuration 11c (which has a wheelbase of 120"), if the second input data indicated a steering wheel angle of 460 degrees, the processor 24 would add the overlay shown at 22-7 in FIG. 4, to the image 20 (FIG. 3) prior to transmitting the image 20 with the overlay 22-7 to the in-cabin display 19.

It can be seen that the lookup table 32 does not require a substantial amount of the memory 21. Furthermore it can be seen that the total number of overlays 22 that needs to be stored in the memory 21 is no more than would need to be stored for the vehicle configuration 11a. It will be noted that for the 4 vehicle configurations shown in the lookup table 32, 13 of the overlays 22 (ie. overlays 22-1 to 22-13 are common to all of the vehicle configurations, a further one overlay (22-14) is common to 3 of them, a further 2 overlays (22-15 and 22-16) are common to 2 of them, and only 2 overlays (22-17 and 22-18) are unique to one of them. Accordingly, the amount of memory consumed by providing the capability of handling 4 different vehicle configurations is not substantially more than the amount of memory already provided on such image processing boards when handling a single vehicle configuration. Additionally, the use of a lookup table is not computationally stressful for the processor 24.

However, it is alternatively possible that instead of a lookup table to determine which overlay 22 to use, the processor 24 could use the steering wheel angle data and the vehicle configuration data to calculate the projected vehicle trajectory and to then select an overlay 22 that is suitable. As another alternative, it is possible for the overlays to be mathematically generated by the processor 24 based on the steering wheel angle data and the vehicle configuration data. In other words, the processor 24 could, using the steering wheel angle data and the vehicle configuration data, calculate the curve on which to draw an overlay 22 instead of grabbing a premade overlay 22 from memory. In such an embodiment, the processor 24 could calculate an entirely new overlay each time it samples the steering wheel angle input, or it could calculate an adjustment to make to the previously drawn overlay each time it samples the steering wheel angle input. In either case, the processor 24 would be capable of drawing a continuous range of overlays 22 as compared to embodiments wherein a premade overlay 22 is pulled from memory and used over a range of steering wheel angles. In such an embodiment, the vehicle configuration data can be used to modify the formulas used by the processor 24 to determine the appropriate curve of the overlay 22. These modifications to the formulas (eg. values for certain constants in the formulas) may be stored in an array or a lookup table stored in memory 21, and which is accessed by the processor 24 based on the vehicle configuration data. The aforementioned lookup table described above is the preferred approach, however.

It will be noted that, in part, many of the overlays 22 are common to the different vehicle configurations because the vehicle configurations are part of the same vehicle family. As such, many of the parameters that would impact the appearance of the overlays would be the same for all members of the vehicle family. Such parameters would include for example, the lateral distance of the camera from the edge of the vehicle, the height of the camera from the ground and the angle of the camera relative to horizontal.

Reference is made to FIG. 6, which shows a variant of the lookup table 32 that will be used to describe an enhancement to the embodiment shown in FIGS. 1-5. In some vehicle families it may be that the vehicle may be fitted with one of two different steering gear mechanisms each with its own gear ratio. The steering gear mechanism is shown in dashed outline at 36 in (FIG. 1). The two alternative steering gear mechanisms that could be used in the vehicle are shown at 36a and 36b in FIG. 6. As can be seen, the vehicle family shown in FIG. 6 includes 5 different vehicle configurations (shown at 11a-11e in FIG. 6), each with its own wheelbase. The first steering gear mechanism 36a can be used on 4 of the configurations. The second steering gear mechanism 36b can be used on 3 of the configurations.

In some cases the particular steering gear mechanism 36 used on the vehicle 11 may not be reflected in the vehicle configuration data (ie. the first input data) that is transmitted to the camera 10. It will be understood of course that without knowing which steering gear mechanism (more particularly, which gear ratio) is used, the camera 10 does not have enough information based solely on the vehicle configuration and the steering wheel angle to determine the projected vehicle trajectory. In the particular exemplary case shown in FIG. 6, if the vehicle configuration data indicates that the vehicle is of type 11a or 11b, the processor 24 would have sufficient data because those configurations only use steering gear mechanism 36a. Similarly, if the vehicle configuration data indicates that the vehicle is of type 11e, the processor 24 would have sufficient data because those configurations only use steering gear mechanism 36b. However, if the vehicle configuration data indicates that the vehicle is of type 11c or 11d, the processor 24 would not have sufficient data because either steering gear mechanism 36a or 36b could be used with those configurations.

In order to determine which of the two steering gear mechanisms 36a or 36b is used on the vehicle 11, the camera 10 is activated and notified when the steering wheel 30 (FIG. 1) is turned to full lock. The second input data (ie, the steering wheel angle data) is transmitted to the camera 10, and the processor 24 compares it to the maximum steering wheel angle shown in the lookup table 32 (FIG. 6) for that particular vehicle configuration. For example, for vehicle configuration 11c, if the steering wheel angle data (ie. the second input data) sent to the camera 10 indicates 680 degrees of rotation, then the processor 24 can determine that the first steering gear mechanism 36a is being used on the vehicle 11. Alternatively, if the steering wheel angle data (ie. the second input data) sent to the camera 10 indicates 590 degrees of rotation, then the processor 24 can determine that the first steering gear mechanism 36b is being used on the vehicle 11.

While the example overlays shown and described herein relate to the predicted vehicle trajectory, it will be understood that other overlays relating to other vehicle properties could be displayed. Additionally it will be understood that the overlays 22 shown and described may not be the only overlays shown on the images 20. Additionally dynamic and/or static overlays could also be shown on the images by the camera.

The processor 24 and memory 21 have been shown in FIG. 3 to be on an image processing board 18. The image sensor 12 may be attached directly to the board 18. It is alternatively possible for the processor 24 to reside on a separate board (not shown), which is distinct from the board to which the image sensor 12 is attached. In another alternative it is possible for the processor 24 to comprise a processor that is integral with the image sensor 12 and one that is separate from the image sensor 12. In such an alternative, both processors are collectively referred to as processor 24. In yet another alternative, it is possible for the processor 24 to comprise an external processor that is outside the housing 14 of the camera 10 that cooperates with one or more processors that are contained within the housing 14. In such an embodiment, such an external processor may be positioned anywhere within the vehicle.

Similarly, the memory 21 may alternatively reside on a board to which the image sensor 12 is integrally attached, or on a board that is separate from the board to which the image sensor 12 is attached. Alternatively the memory 21 may reside in part on the board to which the image sensor 12 is attached and in part on a board that is separate from the board to which the image sensor 12 is attached, in which case the two portions of the memory would collectively be referred to as the memory 21. In yet another alternative, it is possible for the memory 21 to comprise an external processor that is outside the housing 14 of the camera 10 that cooperates with one or more memories that are contained within the housing 14. In such an embodiment, such an external memory may be positioned anywhere within the vehicle.

While the above description constitutes a plurality of embodiments of the present invention, it will be appreciated that the present invention is susceptible to further modification and change without departing from the fair meaning of the accompanying claims.

The invention claimed is:

1. A driver assistance system of a vehicle, said driver assistance system comprising:
   a camera, wherein the camera comprises a lens and an image sensor for capturing image data;
   a processor;
   a memory, wherein the memory stores a plurality of sets of overlays, and wherein each set of the stored plurality of sets of overlays is associated with a respective vehicle configuration of a plurality of different vehicle configurations;
   wherein, when the camera is installed in a particular vehicle equipped with the driver assistance system, the processor is operable to receive a first input pertaining to that particular vehicle via a bus communication of that particular vehicle, and wherein the first input corresponds to a vehicle configuration of the particular vehicle that is equipped with the driver assistance system;
   wherein the processor, responsive to receiving the first input, is operable to select a particular set of stored overlays from the stored plurality of sets of overlays, and wherein the selected set of stored overlays corresponds to the vehicle configuration of the particular vehicle that is equipped with the driver assistance system; and
   wherein, responsive at least in part to a steering angle of the equipped vehicle during a reversing maneuver of the equipped vehicle, the processor selects an individual overlay of the selected set of stored overlays for displaying at a display of the equipped vehicle for viewing by a driver of the equipped vehicle during the reversing maneuver of the equipped vehicle.

2. A driver assistance system as claimed in claim 1, wherein, with the vehicle equipped with the driver assistance system, the processor is further operable to receive a second input corresponding to a steering wheel angle of the equipped vehicle, and wherein the selected set of stored overlays stored in the memory includes individual overlays relating to predicted vehicle trajectories for the vehicle configuration of the particular vehicle that is equipped with the driver assistance system, and wherein the processor is operable to select an individual overlay from the selected set of stored overlays to display based at least in part on the second input.

3. A driver assistance system as claimed in claim 2, wherein, if the vehicle configuration is available with different steering gear ratios, a value is provided in the second input when the steering wheel of the equipped vehicle is at full lock, and wherein the processor is further operable to determine information regarding the steering gear ratio of the equipped vehicle based on the second input.

4. A driver assistance system as claimed in claim 1, wherein the plurality of stored overlays stored in the memory includes a first set of a plurality of first overlays corresponding to a first vehicle configuration and a second set of a plurality of second overlays corresponding to a second vehicle configuration.

5. A driver assistance system as claimed in claim 1, wherein the plurality of sets of stored overlays stored in the memory includes a first set of overlays corresponding to a first vehicle configuration and a common set of overlays corresponding to both the first vehicle configuration and a second vehicle configuration.

6. A driver assistance system as claimed in claim 1, wherein, during operation of the equipped vehicle, the processor determines which individual overlay of the selected set of stored overlays to display by accessing a look up table based at least in part on a second input pertaining to a trajectory of the equipped vehicle.

7. A driver assistance system as claimed in claim 1, wherein the selected set of overlays stored in the memory includes overlays relating to predicted vehicle trajectories, and wherein, with the vehicle equipped with the driver assistance system and during operation of the equipped vehicle, the processor is operable to select a particular individual overlay from the selected set of stored overlays to display based at least in part on a steering wheel angle of the equipped vehicle.

8. A driver assistance system, said driver assistance system comprising:
   a camera, wherein the camera comprises a lens and an image sensor for capturing image data;
   a processor;
   a display;
   a memory, wherein the memory stores a plurality of sets of overlays associated with different vehicle configurations, and wherein each of the stored sets of overlays is associated with a respective vehicle configuration;
   wherein, responsive to an input pertaining to the configuration of the particular vehicle equipped with the driver assistance system, the processor is operable to select a particular stored set of overlays from the stored plurality of sets of overlays based at least in part on the configuration of the particular vehicle to be equipped with the driver assistance system;
   wherein, during a driving maneuver of the equipped vehicle, the driver assistance system selects an individual overlay from the selected stored set of overlays, and wherein, during the driving maneuver of the equipped vehicle, the driver assistance system displays the selected individual overlay for viewing by a driver of the vehicle during the driving maneuver; and wherein the plurality of stored sets of overlays stored in the memory includes at least one first overlay corresponding to a first vehicle configuration and at least one common overlay corresponding to both the first vehicle configuration and to a second vehicle configuration.

9. A driver assistance system as claimed in claim 8, wherein, with the vehicle equipped with the driver assistance system, the configuration of the equipped vehicle is provided as an input to the driver assistance system.

10. A driver assistance system as claimed in claim 8, wherein the processor determines the selected particular individual stored overlay from the selected set of stored overlays by accessing a look up table.

11. A driver assistance system as claimed in claim 8, wherein the selected set of stored overlays stored in the memory includes individual stored overlays relating to predicted vehicle trajectories for the particular vehicle configuration, and wherein, with the vehicle equipped with the driver assistance system and during operation of the equipped vehicle, the processor is operable to select a particular individual overlay from the selected set of stored overlays to display based at least in part on a steering wheel angle of the equipped vehicle.

12. A driver assistance system as claimed in claim 11, wherein the processor is operable to receive an input corresponding to the steering wheel angle of the equipped vehicle.

13. A driver assistance system as claimed in claim 12, wherein, if the configuration of the vehicle is available with different steering gear ratios, a value is provided in the input when the steering wheel of the equipped vehicle is at full lock, and wherein the processor is further operable to determine information regarding the steering gear ratio of the equipped vehicle based on the input.

14. A driver assistance system, said driver assistance system comprising:
a camera, wherein the camera comprises a lens and an image sensor for capturing image data;
a processor;
a memory, wherein the memory stores a plurality of sets of overlays corresponding to different vehicle configurations, and wherein each set of overlays of said plurality of sets of overlays corresponds to a respective vehicle configuration, and wherein individual overlays of each set of overlays of said plurality of sets of overlays correspond to respective predicted trajectories associated with the respective vehicle configuration;
wherein the processor is operable to select a particular set of stored overlays from the stored plurality of sets of overlays based at least in part on an input pertaining to the configuration of the particular vehicle that is equipped with the driver assistance system;
wherein, during operation of the equipped vehicle and based at least in part on the predicted trajectory of the equipped vehicle, the processor is operable to select a particular individual overlay from the selected particular set of stored overlays to display, and wherein the selected particular individual stored overlay is associated with the configuration of the particular equipped vehicle and the predicted trajectory of the equipped vehicle.

15. A driver assistance system as claimed in claim 14, wherein the configuration of the particular equipped vehicle is provided as an input to the driver assistance system via a communication bus of the particular equipped vehicle.

16. A driver assistance system as claimed in claim 14, wherein, during operation of the particular equipped vehicle, the processor is operable to select a particular individual overlay to display based at least in part on a steering wheel angle of the particular equipped vehicle.

17. A driver assistance system as claimed in claim 16, wherein the processor is operable to receive an input corresponding to the steering wheel angle of the particular equipped vehicle.

18. A driver assistance system as claimed in claim 17, wherein, if the configuration of the particular equipped vehicle is available with different steering gear ratios, a value is provided in the input when the steering wheel of the particular equipped vehicle is at full lock, and wherein the processor is further operable to determine information regarding the steering gear ratio of the particular equipped vehicle based on the input.

19. A driver assistance system as claimed in claim 14, wherein the plurality of sets of overlays stored in the memory includes at least one common overlay corresponding to two vehicle configurations.

20. A driver assistance system as claimed in claim 14, wherein the processor determines which individual overlay to display by accessing a look up table having overlays associated with predicted trajectories.

* * * * *